(12) United States Patent
Dai

(10) Patent No.: US 10,052,854 B2
(45) Date of Patent: Aug. 21, 2018

(54) COMPOSITE FLOOR AND MANUFACTURING METHOD THEREOF

(71) Applicant: ZHEJIANG KINGDOM PLASTICS INDUSTRY CO., LTD., Jiaxing (CN)

(72) Inventor: Huibin Dai, Jiaxing (CN)

(73) Assignee: ZHEJIANG KINGDOM PLASTICS INDUSTRY CO., LTD., Jiaxing (CN)

( * ) Notice: Subject to any disclaimer, the term of this patent is extended or adjusted under 35 U.S.C. 154(b) by 0 days.

(21) Appl. No.: 15/678,205

(22) Filed: Aug. 16, 2017

(65) Prior Publication Data

US 2018/0207918 A1   Jul. 26, 2018

(30) Foreign Application Priority Data

Jan. 23, 2017   (CN) .......................... 2017 1 0050874

(51) Int. Cl.
| | |
|---|---|
| *B29D 7/00* | (2006.01) |
| *B32B 27/30* | (2006.01) |
| *B32B 27/14* | (2006.01) |
| *B32B 5/22* | (2006.01) |
| *C08K 3/08* | (2006.01) |
| *C08K 3/04* | (2006.01) |
| *C08K 3/26* | (2006.01) |
| *C08K 5/10* | (2006.01) |

(52) U.S. Cl.
CPC ............. *B32B 27/304* (2013.01); *B29D 7/00* (2013.01); *B32B 5/22* (2013.01); *B32B 27/14* (2013.01); *C08K 3/04* (2013.01); *C08K 3/08* (2013.01); *C08K 3/26* (2013.01); *C08K 5/10* (2013.01); *C08K 2003/0893* (2013.01); *C08K 2003/262* (2013.01)

(58) Field of Classification Search
CPC ......... B32B 27/304; B32B 5/22; B32B 21/00; B32B 25/04; B32B 27/14; B29D 7/00; B29C 66/72329; B29C 47/004; B29C 47/04
See application file for complete search history.

(56) References Cited

U.S. PATENT DOCUMENTS

| | | | | |
|---|---|---|---|---|
| 4,128,689 A | * | 12/1978 | Heaps .................. | B29C 44/505 156/244.24 |
| 2007/0141316 A1 | * | 6/2007 | McGrath ............ | B29C 47/0004 428/292.1 |

* cited by examiner

*Primary Examiner* — Stella K Yi
(74) *Attorney, Agent, or Firm* — Perkins Coie LLP

(57) ABSTRACT

The present invention provides a composite floor and a manufacturing method thereof. The composite floor comprises a coextrusion layer compression moulded by a coextrusion process. The coextrusion layer comprises a first PVC (polyvinyl chloride) equilibrium layer, a WPC (Wood/Plastic Composite) foaming layer, and a second PVC equilibrium layer sequentially arranged from top to bottom. In the composite floor of this invention, the WPC foaming layer is the main material layer, and thus the whole weight of the floor is reduced. The first PVC equilibrium layer and the second PVC equilibrium layer are arranged respectively at two sides of the WPC foaming layer so that the composite floor is more stable in performance. It is more friendly to environment and simple in manufacturing procedure to adopt the coextrusion process for compression moulding because of avoiding bonding using glue.

7 Claims, 1 Drawing Sheet

COMPOSITE FLOOR AND MANUFACTURING METHOD THEREOF

CROSS-REFERENCE TO RELATED APPLICATIONS

This application is a continuation of PCT/CN2017/077082 filed Mar. 17, 2017, which claims priority under 35 U.S.C. § 119(a) on Patent Application No(s). 201710050874.1 filed in People's Republic of China on Jan. 23, 2017, the entire contents of both which are hereby incorporated by reference.

BACKGROUND OF THE INVENTION

Field of the Invention

The present invention relates to the field of floor technologies, and more particularly, to a composite floor and a manufacturing method thereof.

Description of the Related Art

A polyvinyl chloride (PVC) floor is the floor manufactured by using polyvinyl chloride as the major raw material and adding auxiliary materials such as fillers, plasticizers, stabilizers, colorants and so on. Ordinary PVC floor has multilayer structures, generally including a wear-resistant layer, a printing film layer, a medium material layer, a base material layer, etc. The medium material layer and the base material layer of the PVC floor are usually large in density, and thus the floor is relatively heavy in weight, making the use of the floor inconvenient. A wood/plastic composite (WPC) floor generally includes a surface layer, a foaming material layer, and a mute layer. The foaming material layer is made from low-density foaming materials. Therefore, the whole weight of the WPC floor is relatively light. Layers of the existing WPC floor generally are bonded with glue, which is prone to insecure bonding, leading to complex manufacturing process and higher labor cost. During the using process, as affected by the temperature and humidity of the environment, the glue between each layer is liable to losing efficacy and coming off. Furthermore, the WPC floor is not high-temperature resistant, and it begins to warp when the temperature is above 50° C. Warpage ≥2 mm makes the floor unable to be used continually and results in a short service life.

BRIEF SUMMARY OF THE INVENTION

To solve the above problems, an objective of the present invention is to provide a composite floor and a manufacturing method thereof. The composite floor is light in weight, high-temperature resistant, less liable to delaminate, less liable to warp, and long in service life.

To achieve the above objective, the present invention provides a composite floor, including a coextrusion layer compression moulded by using a coextrusion process. The coextrusion layer includes a first polyvinyl chloride (PVC) equilibrium layer, a wood/plastic composite (WPC) foaming layer, and a second PVC equilibrium layer sequentially arranged from top to bottom.

In an embodiment of the present invention, the coextrusion layer may further include a mute layer, which may be arranged beneath the second PVC equilibrium layer.

In an embodiment of the present invention, a printing film layer and a wear-resistant layer may be further included. The printing film layer may be arranged on the first PVC equilibrium layer, and the wear-resistant layer may be arranged on the printing film layer.

In an embodiment of the present invention, the first PVC equilibrium layer and the second PVC equilibrium layer may be made from identical materials. The first PVC equilibrium layer may be made from following raw materials of parts by weight: PVC 20-30 parts by weight, calcium carbonate 65-75 parts by weight, calcium-zinc stabilizer 1-3 parts by weight, chlorinated polyethylene 1-3 parts by weight, acrylic ester 0.5-1.5 parts by weight, PE-wax 0.1-0.5 parts by weight, stearic acid 0.1-0.5 parts by weight, and carbon black 0.1-0.5 parts by weight.

In an embodiment of the present invention, the WPC foaming layer may be made from following raw materials of parts by weight: polyvinyl chloride 35-55 parts by weight, stone powder 40-50 parts by weight, calcium-zinc stabilizer 2-3 parts by weight, internal lubricant for PVC 0.2-0.6 parts by weight, external lubricant for PVC 0.1-0.4 parts by weight, acrylic ester 3-5 parts by weight, oxidized polyethylene homopolymer 0.1-0.4 parts by weight, sodium bicarbonate 0.1-0.4 parts by weight, 2,2-azobisisobutyronitrile 0.1-0.4 parts by weight and chlorinated polyvinyl chloride 1-2 parts by weight.

The present invention further provides a manufacturing method of the composite floor, including following steps:

S1: respectively mixing raw materials of the PVC equilibrium layers and raw materials of the WPC foaming layer;

S2: extruding the raw materials of the WPC foaming layer into a layer, and extruding the raw materials of the PVC equilibrium layers into two layers, namely the first PVC equilibrium layer and the second PVC equilibrium layer, wherein the first PVC equilibrium layer is extruded on the WPC foaming layer, the second PVC equilibrium layer is extruded beneath the WPC foaming layer, and the first PVC equilibrium layer, the WPC foaming layer and the second PVC equilibrium layer form a coextrusion layer semi-finished product; and S3: moving the coextrusion layer semi-finished product to be between a pair of oppositely-arranged pressing rollers for compression moulding, a temperature of the pressing rollers ranging from 180° C. to 210° C., and a space between the pair of pressing rollers being 0.7 mm-1.3 mm subtracted from a thickness of the coextrusion layer semi-finished product.

In an embodiment of the present invention, a movement speed of the coextrusion layer semi-finished product may range from 0.5 m/min to 1.5 m/min.

In an embodiment of the present invention, the Step S1 may further include preheating the mixed raw materials of the PVC equilibrium layers to 170° C.-190° C., and preheating the mixed raw materials of the WPC foaming layer to 170° C.-190° C.

In an embodiment of the present invention, the Step S1 may further include mixing raw materials of a mute layer; and the Step S2 may further include extruding the raw materials of the mute layer to be beneath the second PVC equilibrium layer. The mute layer, the first PVC equilibrium layer, the WPC foaming layer and the second PVC equilibrium layer may form the coextrusion layer semi-finished product.

In an embodiment of the present invention, the PVC equilibrium layers may be made from following raw materials of parts by weight: PVC 20-30 parts by weight, calcium carbonate 65-75 parts by weight, calcium-zinc stabilizer 1-3 parts by weight, chlorinated polyethylene 1-3 parts by weight, acrylic ester 0.5-1.5 parts by weight, PE-wax 0.1-0.5 parts by weight, stearic acid 0.1-0.5 parts by weight, and carbon black 0.1-0.5 parts by weight. The WPC foaming layer may be made from following raw materials of parts by weight: polyvinyl chloride 35-55 parts by weight, stone powder 40-50 parts by weight, calcium-zinc stabilizer 2-3 parts by weight, internal lubricant for PVC 0.2-0.6 parts by weight, external lubricant for PVC 0.1-0.4 parts by weight, acrylic ester 3-5 parts by weight, oxidized polyethylene homopolymer 0.1-0.4 parts by weight, sodium bicarbonate 0.1-0.4 parts by weight, 2,2-azobisisobutyronitrile 0.1-0.4 parts by weight and chlorinated polyvinyl chloride 1-2 parts by weight.

Compared with the prior art, beneficial effects of this technical solution are as below.

In the composite floor of the present invention, the WPC foaming layer is used as a main material layer, which reduced the whole weight of the floor; and the first PVC equilibrium layer and the second PVC equilibrium layer are arranged respectively at two sides of the WPC foaming layer so that the composite floor is more stable in performance. It is more friendly to environment and simple in manufacturing procedure to adopt the coextrusion process for compression moulding because of avoiding bonding using glue. Use of the coextrusion process makes various layers bond more compact, and few delamination and warpage due to effect of environmental changes may occur. Furthermore, the composite floor of the present invention is low in expansion rate, low in shrinkage rate, excellent in performance and long in service life.

DETAILED DESCRIPTION OF THE INVENTION

The technical solutions of the present invention are described clearly and completely below by means of specific embodiments and with reference to the accompanying drawings.

Figure 1:
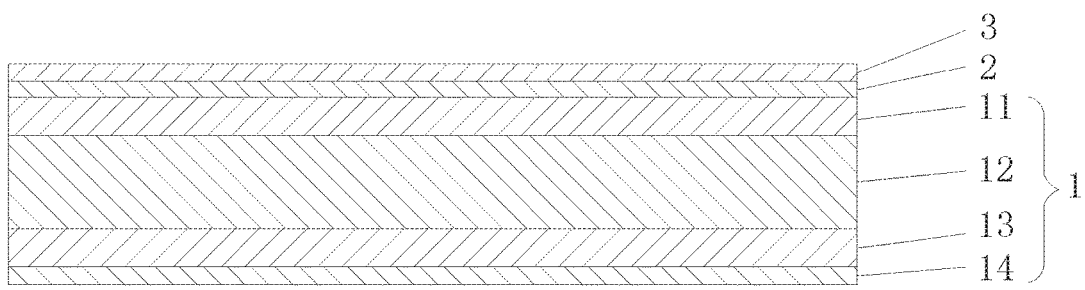
FIG. 1 is a schematic structural diagram of a composite floor according to an embodiment of the present invention.

Referring to FIG. 1, the present invention provides a composite floor, which includes a coextrusion layer 1 compression moulded by a coextrusion process. The coextrusion layer 1 includes a first polyvinyl chloride (PVC) equilibrium layer 11, a wood/plastic composite (WPC) foaming layer 12, and a second PVC equilibrium layer 13 sequentially arranged from top to bottom. The first PVC equilibrium layer 11 and the second PVC equilibrium layer 13 respectively clamp the WPC foaming layer 12 from two sides of the WPC foaming layer 12 so that the composite floor is more stable in performance. In another embodiment, the coextrusion layer 1 further includes a mute layer 14, which is arranged beneath the second PVC equilibrium layer 3. The mute layer 14 arranged beneath the second PVC equilibrium layer 3 may have an effect of reducing noise so that the composite floor is more applicable to indoor environments. The mute layer 14 is made from IXPE (electronic cross-linked polyethylene foam) materials.

The composite floor further includes a printing film layer 2 and a wear-resistant layer 3. The printing film layer 2 is arranged on the first PVC equilibrium layer 11, and the wear-resistant layer 3 is arranged on the printing film layer 2.

The first PVC equilibrium layer 11 and the second PVC equilibrium layer 13 are made from identical materials. The first PVC equilibrium layer is made from following raw materials of parts by weight: PVC 20-30 parts by weight, calcium carbonate 65-75 parts by weight, calcium-zinc stabilizer 1-3 parts by weight, chlorinated polyethylene 1-3 parts by weight, acrylic ester 0.5-1.5 parts by weight, PE-wax 0.1-0.5 parts by weight, stearic acid 0.1-0.5 parts by weight, and carbon black 0.1-0.5 parts by weight.

The WPC foaming layer is made from following raw materials of parts by weight: polyvinyl chloride 35-55 parts by weight, stone powder 40-50 parts by weight, calcium-zinc stabilizer 2-3 parts by weight, internal lubricant for PVC 0.2-0.6 parts by weight, external lubricant for PVC 0.1-0.4 parts by weight, acrylic ester 3-5 parts by weight, oxidized polyethylene homopolymer 0.1-0.4 parts by weight, sodium bicarbonate 0.1-0.4 parts by weight, 2,2-azobisisobutyronitrile 0.1-0.4 parts by weight and chlorinated polyvinyl chloride 1-2 parts by weight. The internal lubricant for PVC uses polyhydroxy alcohol fatty acid ester having types of G16, ZB60, OA6 or 70S. The external lubricant for PVC adopts acrylic polymers having types of ZB74, ZB175, ZB101 or G74.

The manufacturing method of the above composite floor includes following steps:

S1: respectively mixing raw materials of the PVC equilibrium layers and raw materials of the WPC foaming layer. The PVC equilibrium layers are made from following raw materials of parts by weight: PVC 20-30 parts by weight, calcium carbonate 65-75 parts by weight, calcium-zinc stabilizer 1-3 parts by weight, chlorinated polyethylene 1-3 parts by weight, acrylic ester 0.5-1.5 parts by weight, PE-wax 0.1-0.5 parts by weight, stearic acid 0.1-0.5 parts by weight, and carbon black 0.1-0.5 parts by weight. The WPC foaming layer is made from following raw materials of parts by weight: polyvinyl chloride 35-55 parts by weight, stone powder 40-50 parts by weight, calcium-zinc stabilizer 2-3 parts by weight, internal lubricant for PVC 0.2-0.6 parts by weight, external lubricant for PVC 0.1-0.4 parts by weight, acrylic ester 3-5 parts by weight, oxidized polyethylene homopolymer 0.1-0.4 parts by weight, sodium bicarbonate 0.1-0.4 parts by weight, 2,2-azobisisobutyronitrile 0.1-0.4 parts by weight and chlorinated polyvinyl chloride 1-2 parts by weight.

S2: extruding the raw materials of the WPC foaming layer into a layer, and extruding the raw materials of the PVC equilibrium layers into two layers, namely the first PVC equilibrium layer and the second PVC equilibrium layer. The first PVC equilibrium layer is extruded on the WPC foaming layer, and the second PVC equilibrium layer is extruded beneath the WPC foaming layer. The first PVC equilibrium layer, the WPC foaming layer and the second PVC equilibrium layer form a coextrusion layer semi-finished product.

Figure 2:
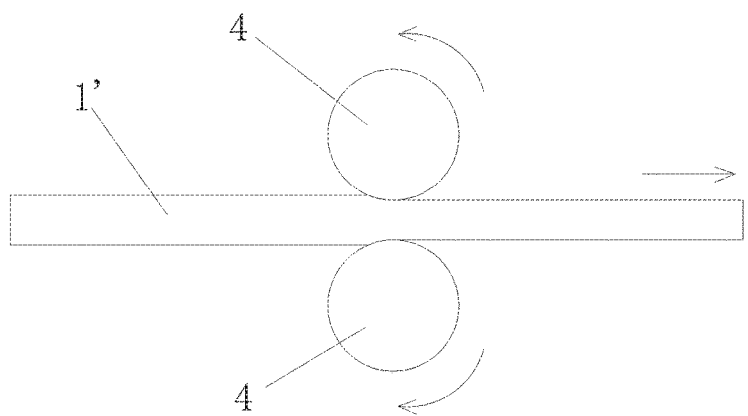
FIG. 2 is a schematic diagram of extruding a coextrusion layer semi-finished product by a pair of pressing rollers in a manufacturing process of the composite floor.

S3: moving the coextrusion layer semi-finished product 1' to be between a pair of oppositely-arranged pressing rollers 4 for compression moulding. A movement speed of the coextrusion layer semi-finished product ranges from 0.5 m/min to 1.5 m/min. Under the movement of the coextrusion layer semi-finished product 1', the pair of pressing rollers 4 rotate to extrude the coextrusion layer semi-finished product 1', as shown in FIG. 2. A temperature of the pressing rollers ranges from 180° C. to 210° C., and a space between the pair of pressing rollers is 0.7 mm-1.3 mm subtracted from a thickness of the coextrusion layer semi-finished product.

In addition, the manufacturing method of the composite floor further includes preheating the mixed raw materials of the PVC equilibrium layers to 170° C.-190° C., and preheating the mixed raw materials of the WPC foaming layer to 170° C.-190° C.

In addition, for the composite floor provided with a mute layer, the Step S1 further includes mixing raw materials of the mute layer; and the Step S2 further includes extruding the raw materials of the mute layer to be beneath the second PVC equilibrium layer. The mute layer, the first PVC equilibrium layer, the WPC foaming layer and the second PVC equilibrium layer form the coextrusion layer semi-finished product.

Specific embodiments are as below.

Embodiment 1

A composite floor includes a wear-resistant layer, a printing film layer, a first PVC equilibrium layer, a WPC foaming layer and a second PVC equilibrium layer sequentially arranged from top to bottom. The first PVC equilibrium layer, the WPC foaming layer and the second PVC equilibrium layer are compression moulded using a coextrusion process. Both the first PVC equilibrium layer and the second PVC equilibrium layer are made from following raw materials of parts by weight: PVC 20 parts by weight, calcium carbonate 65 parts by weight, calcium-zinc stabilizer 1 parts by weight, chlorinated polyethylene 1 parts by weight, acrylic ester 0.5 parts by weight, PE-wax 0.1 parts by weight, stearic acid 0.1 parts by weight, and carbon black 0.1 parts by weight. The WPC foaming layer is made from following raw materials of parts by weight: polyvinyl chloride 35 parts by weight, stone powder 40 parts by weight, calcium-zinc stabilizer 2 parts by weight, internal lubricant for PVC 0.2 parts by weight, external lubricant for PVC 0.1 parts by weight, acrylic ester 3 parts by weight, oxidized polyethylene homopolymer 0.1 parts by weight, sodium bicarbonate 0.1 parts by weight, 2,2-azobisisobutyronitrile 0.1 parts by weight and chlorinated polyvinyl chloride 1 parts by weight.

The manufacturing method of the above composite floor includes following steps:

S1: respectively mixing raw materials of the PVC equilibrium layers and raw materials of the WPC foaming layer. The raw materials of the PVC equilibrium layers are as below: PVC 20 parts by weight, calcium carbonate 65 parts by weight, calcium-zinc stabilizer 1 parts by weight, chlorinated polyethylene 1 parts by weight, acrylic ester 0.5 parts by weight, PE-wax 0.1 parts by weight, stearic acid 0.1 parts by weight, and carbon black 0.1 parts by weight. The raw materials of the WPC foaming layer are as below: polyvinyl chloride 35 parts by weight, stone powder 40 parts by weight, calcium-zinc stabilizer 2 parts by weight, internal lubricant for PVC 0.2 parts by weight, external lubricant for PVC 0.1 parts by weight, acrylic ester 3 parts by weight, oxidized polyethylene homopolymer 0.1 parts by weight, sodium bicarbonate 0.1 parts by weight, 2,2-azobisisobutyronitrile 0.1 parts by weight and chlorinated polyvinyl chloride 1 parts by weight.

S2: preheating the mixed raw materials of the WPC foaming layer to 170° C., and extruding the raw materials of the WPC foaming layer into a layer; and preheating the mixed raw materials of the PVC equilibrium layers to 170° C., and extruding the raw materials of the PVC equilibrium layers into two layers, namely the first PVC equilibrium layer and the second PVC equilibrium layer. The first PVC equilibrium layer is extruded on the WPC foaming layer, and the second PVC equilibrium layer is extruded beneath the WPC foaming layer. The first PVC equilibrium layer, the WPC foaming layer and the second PVC equilibrium layer form a coextrusion layer semi-finished product.

S3: moving the coextrusion layer semi-finished product at the speed of 0.5 m/min to be between a pair of oppositely-arranged pressing rollers for compression moulding. The temperature of the pressing rollers is 180° C., and the space between the pair of pressing rollers is 1.3 mm subtracted from the thickness of the coextrusion layer semi-finished product.

S4: obtaining the composite floor by pasting the printing film layer and the wear-resistant layer in sequence on the first PVC equilibrium layer.

Embodiment 2

A composite floor includes a wear-resistant layer, a printing film layer, a first PVC equilibrium layer, a WPC foaming layer, a second PVC equilibrium layer and a mute layer sequentially arranged from top to bottom. The first PVC equilibrium layer, the WPC foaming layer, the second PVC equilibrium layer and the mute layer are compression moulded using a coextrusion process. Both the first PVC equilibrium layer and the second PVC equilibrium layer are made from following raw materials of parts by weight: PVC 30 parts by weight, calcium carbonate 75 parts by weight, calcium-zinc stabilizer 3 parts by weight, chlorinated polyethylene 3 parts by weight, acrylic ester 1.5 parts by weight, PE-wax 0.5 parts by weight, stearic acid 0.5 parts by weight, and carbon black 0.5 parts by weight. The WPC foaming layer is made from following raw materials of parts by weight: polyvinyl chloride 55 parts by weight, stone powder 50 parts by weight, calcium-zinc stabilizer 3 parts by weight, internal lubricant for PVC 0.6 parts by weight, external lubricant for PVC 0.4 parts by weight, acrylic ester 5 parts by weight, oxidized polyethylene homopolymer 0.4 parts by weight, sodium bicarbonate 0.4 parts by weight, 2,2-azobisisobutyronitrile 0.4 parts by weight and chlorinated polyvinyl chloride 2 parts by weight. The mute layer is made from IXPE materials.

The manufacturing method of the above composite floor includes following steps:

S1: respectively mixing raw materials of the PVC equilibrium layers, raw materials of the WPC foaming layer and raw materials of the mute layer. The raw materials of the PVC equilibrium layers are as below: PVC 30 parts by weight, calcium carbonate 75 parts by weight, calcium-zinc stabilizer 3 parts by weight, chlorinated polyethylene 3 parts by weight, acrylic ester 1.5 parts by weight, PE-wax 0.5 parts by weight, stearic acid 0.5 parts by weight, and carbon black 0.5 parts by weight. The raw materials of the WPC foaming layer are as below: polyvinyl chloride 55 parts by weight, stone powder 50 parts by weight, calcium-zinc stabilizer 3 parts by weight, internal lubricant for PVC 0.6 parts by weight, external lubricant for PVC 0.4 parts by weight, acrylic ester 5 parts by weight, oxidized polyethylene homopolymer 0.4 parts by weight, sodium bicarbonate 0.4 parts by weight, 2,2-azobisisobutyronitrile 0.4 parts by weight and chlorinated polyvinyl chloride 2 parts by weight. The raw materials of the mute layer are IXPE materials.

S2: preheating the mixed raw materials of the WPC foaming layer to 170° C., and extruding the raw materials of the WPC foaming layer into a layer; and preheating the mixed raw materials of the PVC equilibrium layers to 170° C., and extruding the raw materials of the PVC equilibrium layers into two layers, namely the first PVC equilibrium layer and the second PVC equilibrium layer. The first PVC equilibrium layer is extruded on the WPC foaming layer, and the second PVC equilibrium layer is extruded beneath the WPC foaming layer. The raw materials of the mute layer are preheated to 170° C. and are extruded beneath the second PVC equilibrium layer. The first PVC equilibrium layer, the WPC foaming layer, the second PVC equilibrium layer and the mute layer form the coextrusion layer semi-finished product.

S3: moving the coextrusion layer semi-finished product at the speed of 0.5 m/min to be between a pair of oppositely-arranged pressing rollers for compression moulding. The temperature of the pressing rollers is 180° C., and the space between the pair of pressing rollers is 1.3 mm subtracted from the thickness of the coextrusion layer semi-finished product.

S4: obtaining the composite floor by pasting the printing film layer and the wear-resistant layer in sequence on the first PVC equilibrium layer.

Embodiment 3

A composite floor includes a wear-resistant layer, a printing film layer, a first PVC equilibrium layer, a WPC foaming layer and a second PVC equilibrium layer sequentially arranged from top to bottom. The first PVC equilibrium layer, the WPC foaming layer and the second PVC equilibrium layer are compression moulded using a coextrusion process. Both the first PVC equilibrium layer and the second PVC equilibrium layer are made from following raw materials of parts by weight: PVC 23 parts by weight, calcium carbonate 68 parts by weight, calcium-zinc stabilizer 2 parts by weight, chlorinated polyethylene 1 parts by weight, acrylic ester 0.8 parts by weight, PE-wax 0.2 parts by weight, stearic acid 0.3 parts by weight, and carbon black 0.2 parts by weight. The WPC foaming layer is made from following raw materials of parts by weight: polyvinyl chloride 40 parts by weight, stone powder 42 parts by weight, calcium-zinc stabilizer 2 parts by weight, internal lubricant for PVC 0.3 parts by weight, external lubricant for PVC 0.3 parts by weight, acrylic ester 4 parts by weight, oxidized polyethylene homopolymer 0.2 parts by weight, sodium bicarbonate 0.2 parts by weight, 2,2-azobisisobutyronitrile 0.2 parts by weight and chlorinated polyvinyl chloride 1 parts by weight.

The manufacturing method of the above composite floor includes following steps:

S1: respectively mixing raw materials of the PVC equilibrium layers and raw materials of the WPC foaming layer. The raw materials of the PVC equilibrium layers are as below: PVC 23 parts by weight, calcium carbonate 68 parts by weight, calcium-zinc stabilizer 2 parts by weight, chlorinated polyethylene 1 parts by weight, acrylic ester 0.8 parts by weight, PE-wax 0.2 parts by weight, stearic acid 0.3 parts by weight, and carbon black 0.2 parts by weight. The raw materials of the WPC foaming layer are as below: polyvinyl chloride 40 parts by weight, stone powder 42 parts by weight, calcium-zinc stabilizer 2 parts by weight, internal lubricant for PVC 0.3 parts by weight, external lubricant for PVC 0.3 parts by weight, acrylic ester 4 parts by weight, oxidized polyethylene homopolymer 0.2 parts by weight, sodium bicarbonate 0.2 parts by weight, 2,2-azobisisobutyronitrile 0.2 parts by weight and chlorinated polyvinyl chloride 1 parts by weight.

S2: preheating the mixed raw materials of the WPC foaming layer to 180° C., and extruding the raw materials of the WPC foaming layer into a layer; and preheating the mixed raw materials of the PVC equilibrium layers to 180° C., and extruding the raw materials of the PVC equilibrium layers into two layers, namely the first PVC equilibrium layer and the second PVC equilibrium layer. The first PVC equilibrium layer is extruded on the WPC foaming layer, and the second PVC equilibrium layer is extruded beneath the WPC foaming layer. The first PVC equilibrium layer, the WPC foaming layer and the second PVC equilibrium layer form a coextrusion layer semi-finished product.

S3: moving the coextrusion layer semi-finished product at the speed of 0.8 m/min to be between a pair of oppositely-arranged pressing rollers for compression moulding. The temperature of the pressing rollers is 190° C., and the space between the pair of pressing rollers is 1.1 mm subtracted from the thickness of the coextrusion layer semi-finished product.

S4: obtaining the composite floor by pasting the printing film layer and the wear-resistant layer in sequence on the first PVC equilibrium layer.

Embodiment 4

A composite floor includes a wear-resistant layer, a printing film layer, a first PVC equilibrium layer, a WPC foaming layer and a second PVC equilibrium layer sequentially arranged from top to bottom. The first PVC equilibrium layer, the WPC foaming layer and the second PVC equilibrium layer are compression moulded using a coextrusion process. Both the first PVC equilibrium layer and the second PVC equilibrium layer are made from following raw materials of parts by weight: PVC 25 parts by weight, calcium carbonate 70 parts by weight, calcium-zinc stabilizer 2 parts by weight, chlorinated polyethylene 2 parts by weight, acrylic ester 1 parts by weight, PE-wax 0.3 parts by weight, stearic acid 0.3 parts by weight, and carbon black 0.4 parts by weight. The WPC foaming layer is made from following raw materials of parts by weight: polyvinyl chloride 40 parts by weight, stone powder 45 parts by weight, calcium-zinc stabilizer 3 parts by weight, internal lubricant for PVC 0.4 parts by weight, external lubricant for PVC 0.3 parts by weight, acrylic ester 4 parts by weight, oxidized polyethylene homopolymer 0.3 parts by weight, sodium bicarbonate 0.3 parts by weight, 2,2-azobisisobutyronitrile 0.3 parts by weight and chlorinated polyvinyl chloride 2 parts by weight.

The manufacturing method of the above composite floor includes following steps:

S1: respectively mixing raw materials of the PVC equilibrium layers and raw materials of the WPC foaming layer. The raw materials of the PVC equilibrium layers are as below: PVC 25 parts by weight, calcium carbonate 70 parts by weight, calcium-zinc stabilizer 2 parts by weight, chlorinated polyethylene 2 parts by weight, acrylic ester 1 parts by weight, PE-wax 0.3 parts by weight, stearic acid 0.3 parts by weight, and carbon black 0.4 parts by weight. The raw materials of the WPC foaming layer are as below: polyvinyl chloride 40 parts by weight, stone powder 45 parts by weight, calcium-zinc stabilizer 3 parts by weight, internal lubricant for PVC 0.4 parts by weight, external lubricant for PVC 0.3 parts by weight, acrylic ester 4 parts by weight, oxidized polyethylene homopolymer 0.3 parts by weight, sodium bicarbonate 0.3 parts by weight, 2,2-azobisisobutyronitrile 0.3 parts by weight and chlorinated polyvinyl chloride 2 parts by weight.

S2: preheating the mixed raw materials of the WPC foaming layer to 190° C., and extruding the raw materials of the WPC foaming layer into a layer; and preheating the mixed raw materials of the PVC equilibrium layers to 190° C., and extruding the raw materials of the PVC equilibrium layers into two layers, namely the first PVC equilibrium layer and the second PVC equilibrium layer. The first PVC equilibrium layer is extruded on the WPC foaming layer, and the second PVC equilibrium layer is extruded beneath the WPC foaming layer. The first PVC equilibrium layer, the WPC foaming layer and the second PVC equilibrium layer form a coextrusion layer semi-finished product.

S3: moving the coextrusion layer semi-finished product at the speed of 1.0 m/min to be between a pair of oppositely-arranged pressing rollers for compression moulding. The temperature of the pressing rollers is 210° C., and the space between the pair of pressing rollers is 0.9 mm subtracted from the thickness of the coextrusion layer semi-finished product.

S4: obtaining the composite floor by pasting the printing film layer and the wear-resistant layer in sequence on the first PVC equilibrium layer.

Embodiment 5

A composite floor includes a wear-resistant layer, a printing film layer, a first PVC equilibrium layer, a WPC foaming layer and a second PVC equilibrium layer sequentially arranged from top to bottom. The first PVC equilibrium layer, the WPC foaming layer and the second PVC equilibrium layer are compression moulded using a coextrusion process. Both the first PVC equilibrium layer and the second PVC equilibrium layer are made from following raw materials of parts by weight: PVC 28 parts by weight, calcium carbonate 72 parts by weight, calcium-zinc stabilizer 2 parts by weight, chlorinated polyethylene 3 parts by weight, acrylic ester 1.5 parts by weight, PE-wax 0.4 parts by weight, stearic acid 0.4 parts by weight, and carbon black 0.3 parts by weight. The WPC foaming layer is made from following raw materials of parts by weight: polyvinyl chloride 45 parts by weight, stone powder 45 parts by weight, calcium-zinc stabilizer 3 parts by weight, internal lubricant for PVC 0.5 parts by weight, external lubricant for PVC 0.3 parts by weight, acrylic ester 5 parts by weight, oxidized polyethylene homopolymer 0.4 parts by weight, sodium bicarbonate 0.4 parts by weight, 2,2-azobisisobutyronitrile 0.4 parts by weight and chlorinated polyvinyl chloride 2 parts by weight.

The manufacturing method of the above composite floor includes following steps:

S1: respectively mixing raw materials of the PVC equilibrium layers and raw materials of the WPC foaming layer. The raw materials of the PVC equilibrium layers are as below: PVC 28 parts by weight, calcium carbonate 72 parts by weight, calcium-zinc stabilizer 2 parts by weight, chlorinated polyethylene 3 parts by weight, acrylic ester 1.5 parts by weight, PE-wax 0.4 parts by weight, stearic acid 0.4 parts by weight, and carbon black 0.3 parts by weight. The raw materials of the WPC foaming layer are as below: polyvinyl chloride 45 parts by weight, stone powder 45 parts by weight, calcium-zinc stabilizer 3 parts by weight, internal lubricant for PVC 0.5 parts by weight, external lubricant for PVC 0.3 parts by weight, acrylic ester 5 parts by weight, oxidized polyethylene homopolymer 0.4 parts by weight, sodium bicarbonate 0.4 parts by weight, 2,2-azobisisobutyronitrile 0.4 parts by weight and chlorinated polyvinyl chloride 2 parts by weight.

S2: preheating the mixed raw materials of the WPC foaming layer to 185° C., and extruding the raw materials of the WPC foaming layer into a layer; and preheating the mixed raw materials of the PVC equilibrium layers to 185° C., and extruding the raw materials of the PVC equilibrium layers into two layers, namely the first PVC equilibrium layer and the second PVC equilibrium layer. The first PVC equilibrium layer is extruded on the WPC foaming layer, and the second PVC equilibrium layer is extruded beneath the WPC foaming layer. The first PVC equilibrium layer, the WPC foaming layer and the second PVC equilibrium layer form a coextrusion layer semi-finished product.

S3: moving the coextrusion layer semi-finished product at the speed of 1.5 m/min to be between a pair of oppositely-arranged pressing rollers for compression moulding. The temperature of the pressing rollers is 200° C., and the space between the pair of pressing rollers is 0.7 mm subtracted from the thickness of the coextrusion layer semi-finished product.

S4: obtaining the composite floor by pasting the printing film layer and the wear-resistant layer in sequence on the first PVC equilibrium layer.

Comparative Example 1

Materials of various layers of the composite floor of Comparative Example 1 are the same as those of Embodiment 1. However, the compression moulding by the coextrusion process is not used. Each layer is respectively compression moulded, and then various layers are pasted by glue.

Performance tests are carried out on the composite floors of Embodiments 1-5 and Comparative Example 1, and expansion rate, shrinkage rate, and warpage of the composite floors are detected in accordance with Standard EN434, the detection results being as shown in Table 1 as below.

TABLE 1

|  | Expansion rate | Shrinkage rate | Warpage |
| --- | --- | --- | --- |
| Embodiment 1 | 0.10% | 0.08% | 1 mm |
| Embodiment 2 | 0.07% | 0.06% | 0.8 mm |
| Embodiment 3 | 0.06% | 0.06% | 0.9 mm |
| Embodiment 4 | 0.09% | 0.07% | 0.8 mm |
| Embodiment 5 | 0.07% | 0.06% | 1.2 mm |
| Comparative Example 1 | 0.20% | 0.15% | 2.5 mm |

As can be seen, the composite floor of the present invention is low in expansion rate, low in shrinkage rate, high-temperature resistant, small in warpage, stable in performance and long in service life.

While the present invention has been disclosed by preferred embodiments, the preferred embodiments are not used to limit the present invention. Those skilled in the art should understand that, possible change and modification may be made on the technical solution of the present invention, without departing from the spirit and scope of the present invention, by using the methods and technical contents disclosed above. Therefore, any simple modifications, equivalent changes and improvements of the above embodiments, which are not departing from the content of the technical solution of the present invention, according to the technical concept of the present invention, are all within the scope of protection of the technical solution of the present invention.

What is claimed is:

1. A manufacturing method of a composite floor, comprising following steps:
    S1: respectively mixing raw materials of PVC equilibrium layers and raw materials of a WPC foaming layer;
    S2: extruding the raw materials of the WPC foaming layer into a layer, and extruding the raw materials of the PVC equilibrium layers into two layers, namely a first PVC equilibrium layer and a second PVC equilibrium layer, wherein the first PVC equilibrium layer is extruded on the WPC foaming layer, the second PVC equilibrium layer is extruded beneath the WPC foaming layer, and the first PVC equilibrium layer, the WPC foaming layer, and the second PVC equilibrium layer form a coextrusion layer semi-finished product; and
    S3: moving the coextrusion layer semi-finished product to be between a pair of oppositely-arranged pressing rollers for compression moulding, a temperature of the pressing rollers ranging from 180° C. to 210° C., and a space between the pair of pressing rollers being 0.7 mm-1.3 mm subtracted from a thickness of the coextrusion layer semi-finished product;

wherein a movement speed of the coextrusion layer semi-finished product ranges from 0.5 m/min to 1.5 m/min.

2. The manufacturing method according to claim 1, wherein the Step S1 further comprises preheating the mixed raw materials of the PVC equilibrium layers to 170° C.-190° C., and preheating the mixed raw materials of the WPC foaming layer to 170° C.-190° C.

3. The manufacturing method according to claim 1, wherein the Step S1 further comprises mixing raw materials of a mute layer; and the Step S2 further comprises extruding the raw materials of the mute layer to be beneath the second PVC equilibrium layer, wherein the mute layer, the first PVC equilibrium layer, the WPC foaming layer, and the second PVC equilibrium layer form the coextrusion layer semi-finished product.

4. The manufacturing method according to claim 1, wherein the PVC equilibrium layers are made from following raw materials of parts by weight: PVC 20-30 parts by weight, calcium carbonate 65-75 parts by weight, calcium-zinc stabilizer 1-3 parts by weight, chlorinated polyethylene 1-3 parts by weight, acrylic ester 0.5-1.5 parts by weight, PE-wax 0.1-0.5 parts by weight, stearic acid 0.1-0.5 parts by weight, and carbon black 0.1-0.5 parts by weight; and the WPC foaming layer is made from following raw materials of parts by weight: polyvinyl chloride 35-55 parts by weight, stone powder 40-50 parts by weight, calcium-zinc stabilizer 2-3 parts by weight, internal lubricant for PVC 0.2-0.6 parts by weight, external lubricant for PVC 0.1-0.4 parts by weight, acrylic ester 3-5 parts by weight, oxidized polyethylene homopolymer 0.1-0.4 parts by weight, sodium bicarbonate 0.1-0.4 parts by weight, 2,2-azobisisobutyronitrile 0.1-0.4 parts by weight, and chlorinated polyvinyl chloride 1-2 parts by weight.

5. The manufacturing method according to claim 1, wherein the WPC foaming layer is made from following raw materials of parts by weight: polyvinyl chloride 35-55 parts by weight, stone powder 40-50 parts by weight, calcium-zinc stabilizer 2-3 parts by weight, internal lubricant for PVC 0.2-0.6 parts by weight, external lubricant for PVC 0.1-0.4 parts by weight, acrylic ester 3-5 parts by weight, oxidized polyethylene homopolymer 0.1-0.4 parts by weight, sodium bicarbonate 0.1-0.4 parts by weight, 2,2-azobisisobutyronitrile 0.1-0.4 parts by weight and chlorinated polyvinyl chloride 1-2 parts by weight.

6. A manufacturing method of a composite floor, comprising following steps:

S1: respectively mixing raw materials of PVC equilibrium layers and raw materials of a WPC foaming layer;

S2: extruding the raw materials of the WPC foaming layer into a layer, and extruding the raw materials of the PVC equilibrium layers into two layers, namely a first PVC equilibrium layer and a second PVC equilibrium layer, wherein the first PVC equilibrium layer is extruded on the WPC foaming layer, the second PVC equilibrium layer is extruded beneath the WPC foaming layer, and the first PVC equilibrium layer, the WPC foaming layer, and the second PVC equilibrium layer form a coextrusion layer semi-finished product; and S3: moving the coextrusion layer semi-finished product to be between a pair of oppositely-arranged pressing rollers for compression moulding, a temperature of the pressing rollers ranging from 180° C. to 210° C., and a space between the pair of pressing rollers being 0.7 mm-1.3 mm subtracted from a thickness of the coextrusion layer semi-finished product;

wherein the Step S1 further comprises preheating the mixed raw materials of the PVC equilibrium layers to 170° C.-190° C., and preheating the mixed raw materials of the WPC foaming layer to 170° C.-190° C.

7. A manufacturing method of a composite floor, comprising following steps:

S1: respectively mixing raw materials of PVC equilibrium layers and raw materials of a WPC foaming layer;

S2: extruding the raw materials of the WPC foaming layer into a layer, and extruding the raw materials of the PVC equilibrium layers into two layers, namely a first PVC equilibrium layer and a second PVC equilibrium layer, wherein the first PVC equilibrium layer is extruded on the WPC foaming layer, the second PVC equilibrium layer is extruded beneath the WPC foaming layer, and the first PVC equilibrium layer, the WPC foaming layer, and the second PVC equilibrium layer form a coextrusion layer semi-finished product; and S3: moving the coextrusion layer semi-finished product to be between a pair of oppositely-arranged pressing rollers for compression moulding, a temperature of the pressing rollers ranging from 180° C. to 210° C., and a space between the pair of pressing rollers being 0.7 mm-1.3 mm subtracted from a thickness of the coextrusion layer semi-finished product;

wherein the Step S1 further comprises mixing raw materials of a mute layer; and the Step S2 further comprises extruding the raw materials of the mute layer to be beneath the second PVC equilibrium layer, wherein the mute layer, the first PVC equilibrium layer, the WPC foaming layer, and the second PVC equilibrium layer form the coextrusion layer semi-finished product.

* * * * *